United States Patent [19]
Fujioka et al.

[11] Patent Number: 5,785,744
[45] Date of Patent: Jul. 28, 1998

[54] WATER-BASED BLACK RECORDING INK, AND INK-JET RECORDING PROCESS MAKING USE OF THE SAME

[75] Inventors: Masaya Fujioka; Takeo Kitahara; Masahito Kato; Hideto Yamazaki, all of Nagoya, Japan

[73] Assignee: Brother Kogyo Kabushiki Kaisha, Nagoya, Japan

[21] Appl. No.: 707,625

[22] Filed: Sep. 5, 1996

[30] Foreign Application Priority Data

| Sep. 8, 1994 | [JP] | Japan | 7-231470 |
| Sep. 8, 1995 | [JP] | Japan | 7-231469 |
| Sep. 8, 1995 | [JP] | Japan | 7-231471 |
| Sep. 8, 1995 | [JP] | Japan | 7-231472 |
| Sep. 11, 1995 | [JP] | Japan | 7-232590 |
| Sep. 11, 1995 | [JP] | Japan | 7-232592 |
| Sep. 11, 1995 | [JP] | Japan | 7-232593 |

[51] Int. Cl.$^6$ .................................. C09D 11/02
[52] U.S. Cl. .................................. 106/31.27; 106/31.57
[58] Field of Search .................................. 106/31.27, 31.57

[56] References Cited

U.S. PATENT DOCUMENTS

| 4,765,838 | 8/1988 | Ohata et al. | 106/31.52 |
| 5,016,028 | 5/1991 | Temple | 346/140 R |
| 5,084,099 | 1/1992 | Jaeger et al. | 106/31.43 |
| 5,100,469 | 3/1992 | Pontes et al. | 106/31.6 |

FOREIGN PATENT DOCUMENTS

| A1-0 159 291 | 10/1985 | European Pat. Off. |
| A-50-15622 | 2/1975 | Japan |
| A-52-12010 | 1/1977 | Japan |
| A-53-61412 | 6/1978 | Japan |
| A-55-43153 | 3/1980 | Japan |
| A-57-207660 | 12/1982 | Japan |
| A-60-49069 | 3/1985 | Japan |
| A-64-180 | 1/1989 | Japan |
| A-64-36667 | 2/1989 | Japan |
| A-2-150355 | 6/1990 | Japan |
| B2-5-56390 | 8/1993 | Japan |
| 137100 | 5/1997 | Japan |

Primary Examiner—Helene Klemanski
Attorney, Agent, or Firm—Oliff & Berridge, PLC

[57] ABSTRACT

A water-based black recording ink comprises an aqueous medium and a colorant dissolved or dispersed therein, where the colorant comprises a first colorant, having a transmission color having L* of 4 or below and C*ab of 25 or below in the L*a*b* color system, and a second colorant, and a closed angle between the hue angle of the first colorant and that of the second colorant on the a*-b* plane in the L*a*b* color system is 90° or greater.

22 Claims, 2 Drawing Sheets

| Col. 1 | Col. 2 | Col. 3 | Col. 4 | Col. 5 | Col. 6 | Col. 7 | Col. 8 | Col. 9 | Col. 10 | Col. 11 | Col. 12 | Col. 13 | Col. 14 |
|---|---|---|---|---|---|---|---|---|---|---|---|---|---|
| | 1st D. H° | 2nd D. H° | 3rd D. H° | 1-2 Closed angle | 1-3 Closed angle | Composed hue angle | Composed closed angle | Ink L* | Ink C*ab | Record L* | Record C*ab | Record OD | Color tone |
| Ex. 01 | 4.0 | 241.0 | | 123.0 | | | | 0.8 | 4.2 | 38.5 | 3.3 | 1.10 | Good |
| Ex. 02 | 4.0 | 267.7 | | 97.0 | | | | 0.7 | 3.9 | 39.0 | 4.0 | 1.08 | Good |
| Ex. 03 | 4.0 | 250.0 | | 114.0 | | | | 0.8 | 3.9 | 38.3 | 3.6 | 1.10 | Good |
| Ex. 04 | 4.0 | 247.2 | | 116.8 | | | | 0.8 | 3.9 | 38.2 | 2.4 | 1.13 | Good |
| Ex. 05 | 4.0 | 249.8 | | 114.2 | | | | 0.7 | | 39.0 | 3.7 | 1.07 | Good |
| Ex. 06 | 4.0 | 101.2 | | 97.2 | | | | 0.9 | 4.2 | 39.2 | 3.9 | 1.07 | Good |
| Ex. 07 | 4.0 | 94.1 | | 90.1 | | | | 0.9 | 4.0 | 38.8 | 3.9 | 1.10 | Good |
| CEx. 01 | 4.0 | | | | | | | 1.1 | 7.6 | 44.0 | 6.1 | 0.93 | N.G. |
| CEx. 02 | 4.0 | 27.4 | | 23.4 | | | | 1.1 | 8.0 | 43.8 | 7.2 | 0.93 | N.G. |
| Ex. 08 | 4.0 | 101.2 | 241.0 | 97.2 | 123.0 | 171.10 | 167.10 | 0.8 | 4.3 | 38.0 | 3.1 | 1.11 | Good |
| Ex. 09 | 4.0 | 94.1 | 244.2 | 90.1 | 119.8 | 169.15 | 165.15 | 0.8 | 3.5 | 38.6 | 3.9 | 1.06 | Good |
| Ex. 10 | 4.0 | 98.3 | 250.0 | 94.3 | 114.0 | 174.15 | 170.15 | 0.7 | 4.1 | 39.1 | 4.2 | 1.10 | Good |
| Ex. 11 | 4.0 | 99.2 | 247.2 | 95.2 | 116.8 | 173.20 | 169.20 | 0.8 | 3.7 | 38.1 | 3.2 | 1.12 | Good |
| Ex. 12 | 4.0 | 94.1 | 250.0 | 90.1 | 114.0 | 172.05 | 168.05 | 0.7 | 3.7 | 39.1 | 4.3 | 1.04 | Good |
| Ex. 13 | 4.0 | 98.3 | 249.8 | 94.3 | 114.2 | 174.05 | 170.05 | 0.7 | 3.6 | 38.4 | 3.5 | 1.12 | Good |
| CEx. 03 | 4.0 | 101.2 | 27.4 | 97.2 | 23.4 | 64.30 | 60.30 | 1.1 | 8.1 | 42.2 | 5.5 | 0.97 | N.G. |
| CEx. 04 | 4.0 | 99.2 | 13.6 | 95.2 | 9.6 | 56.40 | 52.40 | 1.0 | 8.4 | 42.3 | 6.5 | 0.94 | N.G. |

Fig. 1

| Col. 1 | Col. 2 1st D. H° | Col. 3 2nd D. H° | Col. 4 3rd D. H° | Col. 5 1-2 Closed angle | Col. 6 1-3 Closed angle | Col. 7 Composed hue angle | Col. 8 Composed closed angle | Col. 9 Ink L* | Col. 10 Ink C*ab | Col. 11 Record L* | Col. 12 Record C*ab | Col. 13 Record OD | Col. 14 Color tone |
|---|---|---|---|---|---|---|---|---|---|---|---|---|---|
| Ex. 01 | 4.0 | 241.0 | | 123.0 | | | | 0.8 | 4.2 | 38.5 | 3.3 | 1.10 | Good |
| Ex. 02 | 4.0 | 267.7 | | 97.0 | | | | 0.7 | 3.9 | 39.0 | 4.0 | 1.08 | Good |
| Ex. 03 | 4.0 | 250.0 | | 114.0 | | | | 0.8 | 3.9 | 38.3 | 3.6 | 1.10 | Good |
| Ex. 04 | 4.0 | 247.2 | | 116.8 | | | | 0.8 | 3.9 | 38.2 | 2.4 | 1.13 | Good |
| Ex. 05 | 4.0 | 249.8 | | 114.2 | | | | 0.7 | | 39.0 | 3.7 | 1.07 | Good |
| Ex. 06 | 4.0 | 101.2 | | 97.2 | | | | 0.9 | 4.2 | 39.2 | 3.9 | 1.07 | Good |
| Ex. 07 | 4.0 | 94.1 | | 90.1 | | | | 0.9 | 4.0 | 38.8 | 3.9 | 1.10 | Good |
| CEx. 01 | 4.0 | | | | | | | 1.1 | 7.6 | 44.0 | 6.1 | 0.93 | N.G. |
| Cex. 02 | 4.0 | 27.4 | | 23.4 | | | | 1.1 | 8.0 | 43.8 | 7.2 | 0.93 | N.G. |
| Ex. 08 | 4.0 | 101.2 | 241.0 | 97.2 | 123.0 | 171.10 | 167.10 | 0.8 | 4.3 | 38.0 | 3.1 | 1.11 | Good |
| Ex. 09 | 4.0 | 94.1 | 244.2 | 90.1 | 119.8 | 169.15 | 165.15 | 0.8 | 3.5 | 38.6 | 3.9 | 1.06 | Good |
| Ex. 10 | 4.0 | 98.3 | 250.0 | 94.3 | 114.0 | 174.15 | 170.15 | 0.7 | 4.1 | 39.1 | 4.2 | 1.10 | Good |
| Ex. 11 | 4.0 | 99.2 | 247.2 | 95.2 | 116.8 | 173.20 | 169.20 | 0.8 | 3.7 | 38.1 | 3.2 | 1.12 | Good |
| Ex. 12 | 4.0 | 94.1 | 250.0 | 90.1 | 114.0 | 172.05 | 168.05 | 0.7 | 3.7 | 39.1 | 4.3 | 1.04 | Good |
| Ex. 13 | 4.0 | 98.3 | 249.8 | 94.3 | 114.2 | 174.05 | 170.05 | 0.7 | 3.6 | 38.4 | 3.5 | 1.12 | Good |
| CEx. 03 | 4.0 | 101.2 | 27.4 | 97.2 | 23.4 | 64.30 | 60.30 | 1.1 | 8.1 | 42.2 | 5.5 | 0.97 | N.G. |
| CEx. 04 | 4.0 | 99.2 | 13.6 | 95.2 | 9.6 | 56.40 | 52.40 | 1.0 | 8.4 | 42.3 | 6.5 | 0.94 | N.G. |

Fig. 2

| Col. 1 | Col. 2 1st D. I° | Col. 3 2nd D. I° | Col. 4 3rd D. I° | Col. 5 1-2 Closed angle | Col. 6 1-3 Closed angle | Col. 7 Composed hue angle | Col. 8 Composed closed angle | Col. 9 Ink L* | Col. 10 Ink C*ab | Col. 11 Record L* | Col. 12 Record C*ab | Col. 13 Record OD | Col. 14 Color tone |
|---|---|---|---|---|---|---|---|---|---|---|---|---|---|
| Ex. 14 | 321.0 | 101.2 | | 140.2 | | | | 0.9 | 3.5 | 39.5 | 1.15 | 1.05 | Good |
| Ex. 15 | 321.0 | 94.1 | | 133.1 | | | | 0.8 | 3.7 | 38.9 | 3.9 | 1.06 | Good |
| CEx. 05 | 321.0 | | | | | | | 1.1 | 9.8 | 46.5 | 11.3 | 0.95 | N.G. |
| CEx. 06 | 321.0 | 27.4 | | 66.4 | | | | 1.0 | 14 | 46.5 | 13.7 | 0.96 | N.G. |
| Ex. 16 | 274.1 | 101.2 | | 172.9 | | | | 0.7 | 2.5 | 33.1 | 2.7 | 1.15 | Good |
| Ex. 17 | 274.1 | 94.1 | | 180.0 | | | | 0.8 | 3.1 | 35.7 | 3.5 | 1.13 | Good |
| Ex. 18 | 274.1 | 27.4 | | 113.3 | | | | 0.8 | 3.1 | 36.7 | 3.1 | 1.10 | Good |
| Ex. 19 | 274.1 | 13.6 | | 99.5 | | | | 0.8 | 3.8 | 36.9 | 4.0 | 1.09 | Good |
| Ex. 20 | 274.1 | 101.2 | 27.4 | 172.9 | 113.3 | 64.30 | 150.20 | 0.7 | 2.1 | 32.0 | 2.2 | 1.16 | Good |
| Ex. 21 | 274.1 | 94.1 | 27.4 | 180.0 | 113.3 | 60.75 | 146.65 | 0.7 | 2.4 | 33.2 | 2.3 | 1.15 | Good |
| Ex. 22 | 274.1 | 101.2 | 13.6 | 172.9 | 99.5 | 57.40 | 143.30 | 0.6 | 2.2 | 31.5 | 2.4 | 1.15 | Good |
| CEx. 07 | 274.1 | | | | | | | 1.1 | 5.8 | 44.5 | 7.1 | 0.97 | N.G. |
| CEx. 08 | 274.1 | 250.0 | | | | | | 1.1 | 11 | 43.2 | 12.5 | 0.97 | N.G. |
| CEx. 09 | 274.1 | 250.0 | 27.4 | 24.1 | 113.3 | 138.70 | 135.40 | 1.0 | 8.2 | 43.2 | 8.1 | 0.98 | N.G. |
| CEx. 10 | 274.1 | 101.2 | 241.0 | 24.1 | 33.1 | 171.10 | 103.00 | 1.1 | 8.8 | 43.1 | 8.3 | 0.97 | N.G. |
| Ex. 23 | 359.6 | 241.0 | | 172.9 | | | | 1.1 | 3.8 | 37.6 | 3.9 | 1.09 | Good |
| Ex. 24 | 1.40 | 250.0 | | 118.6 | | | | 0.8 | 3.6 | 37.1 | 3.8 | 1.11 | Good |
| Ex. 25 | 1.00 | 247.2 | | 111.4 | | | | 0.8 | 3.7 | 38.2 | 3.6 | 1.09 | Good |
| Ex. 26 | 359.6 | 101.2 | 241.0 | 101.6 | 118.6 | 171.10 | 171.50 | 0.7 | 3.6 | 37.6 | 3.7 | 1.11 | Good |
| Ex. 27 | 1.4 | 98.3 | 250.0 | 96.9 | 111.4 | 174.15 | 172.75 | 0.8 | 3.5 | 37.8 | 3.6 | 1.13 | Good |
| Ex. 28 | 1.0 | 99.2 | 247.2 | 98.2 | 113.8 | 173.20 | 172.20 | 0.8 | 3.5 | 38.6 | 3.5 | 1.10 | Good |

WATER-BASED BLACK RECORDING INK, AND INK-JET RECORDING PROCESS MAKING USE OF THE SAME

BACKGROUND OF THE INVENTION

1. Field of the Invention

This invention relates to a water-based black recording ink and an ink-jet recording process.

2. Description of the Related Art

Many inventions relating to a water-based black ink have been made, as disclosed in, e.g., Japanese Patent Applications Laid-open No. 50-15622, No. 52-12010, No. 53-61412 and No. 55-43153. There is a demand for the development of a black ink having much higher recording density and much higher safety than these conventional water-based black inks. To satisfy such a demand, it is attempted to produce a black tone by mixing dyes having different colors. An example thereof is disclosed in Japanese Patent Application Laid-open No. 57-207660.

However, there are various problems in these water-based black inks. For example, a mere combination of Y (yellow), M (magenta) and C (cyan) dyes in order to produce a black tone only brings about a low recording density unless the whole dye concentration is made higher, because there is a limit to densities attributable to the respective colors. Making the dye concentration higher tends to cause clogging when an ink is used in an ink-jet recording. Also, the combination of Y, M and C dyes has not been well successful for obtaining a water-based black ink having a good black tone and a high recording density.

As well known, it is also difficult to obtain black color with a good tone by using a black dye alone.

SUMMARY OF THE INVENTION

The present invention was made in order to solve the above problem. An object of the present invention is to provide a water-based black recording ink that can give a good color tone as black color to recorded images, more specifically, can produce recorded images having a lightness L* of 40 or below and a chroma (metric chroma) C*ab of 5 or below and having a high recording density, i.e., an OD value (optical density) of 1 or above; and an ink-jet recording process making use of such an ink.

The object of the present invention has been accomplished by the following present invention.

The present invention provides a water-based black recording ink comprising an aqueous medium and a colorant dissolved or dispersed therein; said colorant comprising:

a first colorant a pure-water-diluted aqueous solution of which, adjusted to have a concentration of from 0.005% by weight to 0.05% by weight, has a transmission color having L* of 4 or below and C*ab of 25 or below in the L*a*b* color system under measuring conditions of a $D_{65}$ light source, 2° visual field and a transmitted-light optical path length of 10 mm, and having a point HA on the a*-b* plane which represents the transmission color of the pure-water-diluted aqueous solution; and a second colorant a pure-water-diluted aqueous solution of which, adjusted to have the same concentration, has a transmission color having a point HB on the a*-b* plane which represents the transmission color of the pure-water-diluted aqueous solution, under the same measuring conditions, and satisfies that a closed angle formed by a straight line connecting an original point and the point HA and a straight line connecting the original point and the point HB is 90° or greater on the a*-b* plane;

said first and second colorants being mixed so that an aqueous solution thereof diluted to 1/200 with pure water has a transmission color having C*ab of 5 or below in the L*a*b* color system under measuring conditions of a $D_{65}$ light source, 2° visual field and a transmitted-light optical path length of 10 mm.

The present invention also provides an ink-jet recording process carried out by jetting an ink to a recording medium in the form of droplets to make a record, wherein, as the ink used is the water-based black recording ink described above.

In the present invention, the closed angle is preferably 130° or greater, and as the second colorant, a mixture of two or more kinds of dyes may be used.

These and other objects, features and advantages of the present invention are described in or will become apparent from the following detailed description of the invention.

BRIEF DESCRIPTION OF THE DRAWINGS

Each of FIGS. 1 and 2 is a list in which, in the Examples and Comparative Examples, there are recited a hue angle of each dye used, a closed angle between a first dye and a second or third dye, a center line angle (composed hue angle) between a second dye and a third dye, a composed, closed angle between a hue angle of a first dye and such a composed hue angle, L* and C*ab of an ink prepared, and L*, C*ab, OD (optical density) and color tone of a recorded image.

DESCRIPTION OF THE PREFERRED EMBODIMENTS

In the water-based black recording ink of the present invention, the first and second colorants are used.

As the first colorant, there can be preferably used a black dye a pure-water-diluted aqueous solution of which, adjusted to have a concentration of from 0.005% by weight to 0.05% by weight, has a transmission color having L* of 4 or below and C*ab of 25 or below in the L*a*b* color system under measuring conditions of a $D_{65}$ light source, 2° visual field and a transmitted-light optical path length of 10 mm, and having a point HA on the a*-b* plane which represents the transmission color of the pure-water-diluted aqueous solution.

As the second colorant, there can be preferbly used a second dye a pure-water-diluted aqueous solution of which, adjusted to have the same concentration, has a transmission color having point HB on the a*-b* plane which represents the transmission color of the pure-water-diluted aqueous solution under the same measuring conditions, and satisfies that a closed angle formed by a straight line connecting an original point and the point HA and a straight line connecting the original point and the point HB is 90° or greater, preferably 130° or more on the a*-b* plane in the L*a*b* color system.

In the present invention, the first and second colorants are mixed so that an aqueous solution thereof diluted to 1/200 with pure water has a transmission color having C*ab of 5 or below in the L*a*b* color system under measuring conditions of a $D_{65}$ light source, 2° visual field and a transmitted-light optical path length of 10 mm.

Thus, the ink of the present invention using the first and second colorants as defined above can give a good color tone as black color to recorded images. Especially, the use of the first and second colorants, between which a closed angle is 130° or greater on the a*-b* plane, can not only give a chroma(C*ab) of 4 or below to an ink, but also give a chroma(C*ab) of 4 or below to recorded images.

As the first and second colorants, any of water-soluble dyes as typified by direct dyes, acid dyes, basic dyes and reactive dyes may be used. Any of such water-soluble dyes are used in conventional ink compositions commonly in a proportion holding from about 0.1% by weight to about 20% by weight, and, in the present invention, preferably from about 0.1% by weight to about 10% by weight.

Next, preferable combinations of the first and second colorants will be in more detail explained using the term of "a hue angle H°" on the a*-b* plane in the L*a*b* color system, which is defined as below.

In the case of a*≧0, b*≧0 (the first quadrant), $$H° = \tan^{-1}(b*/a*);$$

in the case of a*≦0, b*≧0 (the second quadrant), $$H° = 180° + \tan^{-1}(b*/a*);$$

in the case of a*≦0, b*≧0 (the third quadrant), $$H° = 180° + \tan^{-1}(b*/a*); \text{ and}$$

in the case of a*≧0, b*≦0 (the fourth quadrant), $$H° = 360° + \tan^{-1}(b*/a*).$$

In the present invention, a closed angle can be defined as an angle on the a*-b* plane in the L*a*b* color system between a hue angle of a first colorant and that of a second colorant.

In the present invention, as a second colorant, there may be used two or more kinds of dyes, such as a cyan dye, a magenta dye or yellow dye. When such a second colorant is a mixture of two or more kinds of dyes, a hue angle of the second colorant corresponds to a center line angle (composed hue angle) between hue angles of the dyes constituting the second colorant, and a closed angle on the a*-b* plane between the hue angle of the first colorant and that of the second colorant is defined as a composed, closed angle between the hue angle of the first colorant and the composed hue angle of the second colorant.

In the present invention, when the first colorant is a first dye, the second colorant is a mixture of a second dye and a third dye, both of closed angles between a hue angle of the first dye and that of the second dye and between a hue angle of the first dye and that of the third dye are preferably 90° or greater on the a*-b* plane, in order to give a good color tone to recorded images. In addition, a composed, closed angle between the hue angle of the first dye and the composed hue angle of the second and third dyes is preferably 90° or greater on the a*-b* plane.

In the first embedment of the water-based black, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 350° to 10° under measuring conditions of a $D_{65}$ light source, 2° visual field and a transmitted-light optical path length of 10 mm, which is a dye belonging to dyes commonly perceived to have black color. As a second colorant, there is used a second dye an aqueous dye solution of which, adjusted to have the same dye concentration, has a transmission color having a hue angle H° of from 230° to 280° under the same measuring conditions.

The reason why especially the dye giving a hue angle H of from 230° to 280° is used as the second dye is that this dye is a dye commonly perceived to have cyan color and has a hue different from the first dye, and also that, when color inks having an black ink are taken into account, the second dye can be used also as a dye for cyan color ink, and hence the dyes constituting inks can be made common to one another.

In the second embodiment of the water-based black recording ink, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 350° to 10° under measuring conditions of a $D_{65}$ light source, 2° visual field and a transmitted-light optical path length of 10 mm, which is a dye belonging to dyes commonly perceived to have black color. The second colorant is a mixture of a second dye an aqueous dye solution of which, adjusted to have the same dye concentration, has a transmission color having a hue angle H° of from 70° to 120° under the same measuring conditions, and a third dye an aqueous dye solution of which, adjusted to have the same dye concentration, has a transmission color having a hue angle H° of from 230° to 280° under the same measuring conditions.

In this embodiment, the reason why especially the dye giving a hue angle H° of from 70° to 120° is used as the second dye and the dye giving a hue angle H° of from 230° to 280° is used as the third dye is that the dye giving a hue angle H° of from 70° to 120° is a dye commonly perceived to have yellow color, the dye giving a hue angle H° of from 230° to 280° is a dye commonly perceived to have cyan color, and the second and third dyes have hues different from the first dye, and also that, when color inks having black ink are taken into account, the second dye can be used also as a dye for yellow color ink, the third dye can be used also as a dye for cyan color ink, and hence the dyes constituting inks can be made common to one another.

In the third embodiment of the water-based black recording ink, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 315° to 325° under measuring conditions of a $D_{65}$ light source, 2° visual field and a transmitted-light optical path length of 10 mm, which is a dye belonging to dyes commonly perceived to have black color. As a second colorant, there is used a second dye an aqueous dye solution of which, adjusted to have the same dye concentration, has a transmission color having a hue angle H° of from 70° to 120° under the same measuring conditions.

In this embodiment, the reason why especially the dye giving a hue angle H° of from 70° to 120° is used is that this dye is a dye commonly perceived to have yellow color and has a hue different from the dye giving a hue angle H° of from 315° to 325°, and also that, when color inks having black ink are taken into account, the dye giving a hue angle H° of from 70° to 120° can be used also as a dye for yellow color ink, and hence the dyes constituting inks can be made common to one another.

In the fourth embodiment of the water-based black recording ink, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 270° to 280° under measuring conditions of a $D_{65}$ light source, 2° visual field and a transmitted-light optical path length of 10 mm, which is a dye belonging to dyes commonly perceived to have black color. As a second colorant, there is used a second dye an aqueous dye solution of which, adjusted to have the same dye concentration, has a transmission color having a hue angle H° of from 70° to 120° under the same measuring conditions.

In this embodiment, the reason why especially the dye giving a hue angle H° of from 70° to 120° is used as the second dye is that the second dye is a dye commonly perceived to have yellow color and has a hue different from the first dye giving a hue angle H° of from 270° to 280°, and also that, when color inks having black ink are taken into account, the dye giving a hue angle H° of from 70° to 120° can be used also as a dye for a yellow color ink, and hence the dyes constituting inks can be made common to one another.

In the fifth embodiment of the water-based black recording ink, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 270° to 280° under measuring conditions of a $D_{65}$ light source, 2° visual field and a transmitted-light optical path length of 10 mm, which is a dye belonging to dyes commonly perceived to have black color. As a second colorant, there is used a second dye an aqueous dye solution of which, adjusted to have the same dye concentration, has a transmission color having a hue angle H° of from 350° to 40° under the same measuring conditions.

In this embodiment, the reason why especially the dye giving a hue angle H° of from 350° to 40° is used as the second dye is that the second dye is a dye commonly perceived to have magenta color, and the second dye has a hue different from the first dye, and also that, when color inks having black ink are taken into account, the second dye can be used also as a dye for yellow color ink, and hence the dyes constituting inks can be made common to one another In the sixth embodiment of the water-based black recording ink, as a first colorant, there is used a first dye an aqueous dye solution of which, adjusted to have a dye concentration of from 0.005% by weight to 0.05% by weight, has a transmission color having L* of 4 or below and C*ab of 25 or below in the L*a*b* color system and a hue angle H° of from 270° to 280° under measuring conditions of a $D_{65}$ light source, 2° visual field and a transmitted-light optical path length of 10 mm, which is a dye belonging to dyes commonly perceived to have black color. The second colorant is a mixture of a second dye an aqueous dye solution of which, adjusted to have the same dye concentration, has a transmission color having a hue angle H° of from 70° to 120° under the same measuring conditions, and a third dye an aqueous dye solution of which, adjusted to have the same dye concentration, has a transmission color having a hue angle H° of from 350° to 40° under the same measuring conditions.

In this embodiment, the reason why especially the dye giving a hue angle H° of from 70° to 120° is used as the second dye and the dye giving a hue angle H° of from 350° to 40° is used as the third dye is that the dye giving a hue angle H° of from 70° to 120° is a dye commonly perceived to have yellow color, the dye giving a hue angle H° of from 350° to 40° is a dye commonly perceived to have magenta color, and the second and third dyes have hues different from the first dye, and also that, when color inks having black ink are taken into account, the second dye can be used also as a dye for a yellow color ink, the third dye can be used also as a dye for a magenta color ink, and hence the dyes constituting inks can be made common to one another.

The inks of the present invention including the above first to sixth embodiments each have, as basic components, the corresponding colorants (dyes) as described above, and a aqueous medium in which the colorants (dyes) are dissolved.

The aqueous medium used in the ink of the present invention is water or a mixed solvent of water and a water-soluble organic solvent. Particularly preferably, it may be a mixed solvent of water and a water-soluble organic solvent. The water-soluble organic solvent includes those containing a polyhydric alcohol, having a ink-dry preventive effect. As the water, it is preferable to use pure water, ion-exchanged water, distilled water, deionized water water or the like, not containing various ions.

The water-soluble organic solvent used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone. Of these, glycerol, alkylene glycols such as diethylene glycol, and lower alkyl ethers of polyhydric alcohols such as triethylene glycol monoethyl ether are particularly preferred.

The water-soluble organic solvent may be contained in the ink in an amount of usually from 0 to 95% by weight, preferably from 10 to 80% by weight, and more preferably from 20 to 50% by weight, based on the total weight of the ink.

When this water-soluble organic solvent is used, the content of the water may be determined within a wide range, depending on the type of component of the water-soluble organic solvent, the composition thereof and the desired properties of ink, and may be within the range of usually from 10 to 95% by weight, preferably from 10 to 70% by weight, and more preferably from 20 to 70% by weight, based on the total weight of the ink composition.

The ink of the present invention is basically made up as described above. Besides, various conventionally known additives such as dispersants, surface active agents, viscosity modifiers, surface tension modifiers, pH adjusters and antifungal agents may be optionally added. For example, viscosity modifiers such as polyvinyl alcohol, celluloses and water-soluble resins, surface active agents of various types such as cationic, anionic and nonionic types, and pH adjusters such as diethanolamine and triethanolamine. When an ink is prepared which is used in an ink-jet recording process of the type a recording solution is charged, a specific resistance modifier including inorganic salts such as ammonium chloride is added.

The water-based black recording ink of the present invention including the from first to sixth embodiments as described above well solves the problem involved in the prior art, and can produce recorded images having a lightness L* of 40 or below and a chroma C*ab of 5 or below. Hence, it can give a good color tone as black color of recorded images, and also can achieve a high recording density, i.e., an OD value (optical density) of 1 or above. Accordingly, it can be useful as ink for ink-jet recording of various systems, and can be preferable especially as an ink for the ink-jet recording system in which the ink is jetted in the form of droplets by utilizing the vibration of a piezoelectric device and also as an ink for the ink-jet recording system in which the ink is jetted in the form of droplets by utilizing the action of heat energy, the latter being easily affected by the formation of deposits. The present ink can enjoy superior recording.

EXAMPLES

The present invention will be further described below by giving Examples and Comparative Examples. The present invention is by no means limited to these.

In the following Examples and Comparative Examples, recording paper "XEROX 4024DP201b", trade name, available from Xerox Corp. is used in printing. The summarized results obtained are recited in FIGS. 1 and 2.

Further, in FIGS. 1 and 2,

"Ex." and "CEx." in the first column denote—Example— and—Comparative Example—, respectively;

"1st D.H°" in the second column denotes—a hue angle of a first dye—;

"2nd D.H°" in the third column denotes—a hue angle of a second dye—;

"3nd D.H°" in the fourth column denotes—a hue angle of a third dye—;

"1-2 Closed angle" in the fifth column denotes—a closed angle between a hue angle of a first dye and that of a second dye;

"1-3 Closed angle" in the sixth column denotes—a closed angle between a hue angle of a first dye and that of a third dye;

"2-3 Composed hue angle" in the seventh column denotes—a composed hue angle between a hue angle of a second dye and that of a third dye;

"Composed, closed angle" in the eighth column denotes—a composed, closed angle between a first dye and the composed hue angle;

"Ink L*" in the ninth column denotes—a lightness L* of an ink prepared;

"Ink C*ab" in the tenth column denotes—a chroma C*ab of an ink prepared;

"Record L*" in the eleventh column denotes—a lightness L* of a recorded image;

"Record C*ab" in the twelfth column denotes—a chroma C*ab of a recorded image;

"Record OD" in the thirteenth column denotes—an optical density of a recorded image; and "Color tone" and "N.G." in the fourteenth column denotes—a color tone of a recorded image—and—not good—, respectively.

Example 1

As the first colorant(dye), PRO JET FIRST BLACK 2 (trade name; available from Geneca Co.; an aqueous solution with a dye concentration of 4%) and as the second colorant(dye), PRO JET FIRST CYAN 2 (trade name; available from Geneca Co.; an aqueous solution with a dye concentration of 6%), respectively, were selected. Transmission colors of the respective aqueous dye solutions, each adjusted to have a dye concentration of 0.015% by weight, were measured under the measuring conditions of a $D_{65}$ light source, 2° visual field and a transmitted-light optical path length of 10 mm. As a result, in the case of PRO JET FIRST BLACK 2, L* was 0.9 and C*ab was 7.6 in the L*a*b* color system, and the hue angle H° was 4.0°. In the case of PRO JET FIRST CYAN 2, the hue angle H° was 241.0°. Accordingly, the closed angle was calculated at 123.0°.

Using these dyes, ink was prepared and its recording performance was evaluated in the following way: To 9.7 parts by weight of pure water, 75 parts by weight of the dye solution PRO JET FIRST BLACK 2, 0.3 part by weight of the cyan dye solution PRO JET FIRST CYAN 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink composition.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 4.2.

This ink was applied in a shear-mode type ink-jet recording head, disclosed in Japanese Patent Application Laid-open No. 2-150355. As a result, the ink was well jetted, and the recorded images obtained had L* of 38.5, C*ab of 3.3 and an OD value of 1.10. Thus, high-grade recorded images were obtained, having a good color tone as black color and a high recording density.

Example 2

Ink was prepared in the same manner as in Example 1 except that the cyan dye solution PRO JET FIRST CYAN 2 was replaced with a cyan dye DUACYN ACID BLUE AE-SF (trade name; available from H° Hoechst Japan Ltd.; for the transmission color of its aqueous dye solution adjusted to have a dye concentration of 0.015% by weight, the hue angle H° was 267.0° under the measuring conditions of a $D_{65}$ light source, 2° visual field and a transmitted-light optical path length of 10 mm). Accordingly, the closed angle was calculated at 97.0°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.9.

Using this ink, images were recorded similarly. As a result, the ink was well jetted, and the recorded images obtained had L* of 39.0, C*ab of 4.0 and an OD value of 1.08. Thus, high-grade recorded images were obtained, having a good color tone as black color and a high recording density.

Example 3

Ink was prepared in the same manner as in Example 1 except that the cyan dye solution PRO JET FIRST CYAN 2 was replaced with a cyan dye DAIWA IJ BLUE 319H (trade name; available from Daiwa Chemical Co. Ltd.; for the transmission color of its aqueous dye solution adjusted to have a dye concentration of 0.015% by weight, the hue angle H° was 250.0° under the measuring conditions of a $D_{65}$ light source, 2° visual field and a transmitted-light optical path length of 10 mm). Accordingly, the closed angle was calculated at 114.0°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.9.

Using this ink, images were recorded similarly. As a result, the ink was well jetted, and the recorded images obtained had L* of 38.3, C*ab of 3.6 and an OD value of 1.10. Thus, high-grade recorded images were obtained, having a good color tone as black color and a high recording density.

Example 4

Ink was prepared in the same manner as in Example 1 except that the cyan dye solution PRO JET FIRST CYAN 2 was replaced with a cyan dye PRO JET CYAN 1 (trade name; available from Geneca Co.; an aqueous solution with a dye concentration of 10%; for the transmission color of its aqueous dye solution adjusted to have a dye concentration of 0.015% by weight, the hue angle H° was 247.2° under the measuring conditions of a $D_{65}$ light source, 2° visual field and a transmitted-light optical path length of 10 mm). Accordingly, the closed angle was calculated at 116.80.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.9.

Using this ink, images were recorded similarly. As a result, the ink was well jetted, and the recorded images obtained had L* of 38.2, C*ab of 2.4 and an OD value of 1.13. Thus, high-grade recorded images were obtained, having a good color tone as black color and a high recording density.

Example 5

Ink was prepared in the same manner as in Example 1 except that the cyan dye solution PRO JET FIRST CYAN 2 was replaced with a dye solution (for the transmission color of its aqueous dye solution adjusted to have a dye concentration of 0.015% by weight, the hue angle H° was 249.8° under the measuring conditions of a $D_{65}$ light source, 2° visual field and a transmitted-light optical path length of 10 mm). Accordingly, the closed angle was calculated at 114.2°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.6.

Using this ink, images were recorded similarly. As a result, the ink was well jetted, and the recorded images obtained had L* of 39.0, C*ab of 3.7 and an OD value of 1.07. Thus, high-grade recorded images were obtained, having a good color tone as black color and a high recording density.

Example 6

Ink was prepared in the same manner as in Example 1 except that the cyan dye solution PRO JET FIRST CYAN 2 was replaced with a yellow dye PRO JET FAST YELLOW 2 (trade name; available from Geneca Co.; an aqueous solution with a dye concentration of 4.3%; for the transmission color of its aqueous dye solution adjusted to have a dye concentration of 0.015% by weight, the hue angle H° was 101.2° under the measuring conditions of a $D_{65}$ light source, 2° visual field and a transmitted-light optical path length of 10 mm). Accordingly, the closed angle was calculated at 97.2°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.9 and C*ab was 4.2.

Using this ink, images were recorded similarly. As a result, the ink was well jetted, and the recorded images obtained had L* of 39.2, C*ab of 3.9 and an OD value of 1.07. Thus, high-grade recorded images were obtained, having a good color tone as black color and a high recording density.

Example 7

Ink was prepared in the same manner as in Example 1 except that the cyan dye solution PRO JET FIRST CYAN 2 was replaced with a yellow dye DUASYN ACID YELLOW XX-SF (trade name; available from hOECHST Japan Ltd.; for the transmission color of its aqueous dye solution adjusted to have a dye concentration of 0.015% by weight, the hue angle H° was 94.1° under the measuring conditions of a $D_{65}$ light source, 2° visual field and a transmitted-light optical path length of 10 mm). Accordingly, the closed angle was calculated at 90.1°.

This inkwas diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.9 and C*ab was 4.0.

Using this ink, images were recorded similarly. As a result, the ink was well jetted, and the recorded images obtained had L* of 38.8, C*ab of 3.9 and an OD value of 1.10. Thus, high-grade recorded images were obtained, having a good color tone as black color and a high recording density.

Comparative Example 1

Ink was prepared in the same manner as in Example 1 except that the cyan dye solution PRO JET FIRST CYAN 2 was not added.

This ink composition was diluted to 1/200 with pure water (dye concentration: 0.015%), and its transmission color was measured under the measuring conditions of a $D_{65}$ light source, 2° visual field and a transmitted-light optical path length of 10 mm to reveal that L* was 1.1 and C*ab was 7.6.

Using this ink, images were recorded similarly. As a result, the ink was well jetted, but the recorded images obtained had L* of 44.0, C*ab of 6.1 and an OD value of 0.93. Thus, recorded images had not a good color tone as black color and had a low recording density.

Comparative Example 2

Ink was prepared in the same manner as in Example 1 except that the cyan dye solution PRO JET FIRST CYAN 2 was replaced with a magenta dye solution PRO JET FIRST MAGENTA 2 (trade name; available from Geneca Co.; an aqueous solution with a dye concentration of 5%; for the transmission color of its aqueous dye solution adjusted to have a dye concentration of 0.015% by weight, the hue angle H° was 27.4° under the measuring conditions of a $D_{65}$ light source, 2° visual field and a transmitted-light optical path length of 10 mm). Accordingly, the closed angle was calculated at 23.4°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 1.1 and C*ab was 8.0.

Using this ink, images were recorded similarly. As a result, the ink was well jetted, but the recorded images obtained had L* of 43.8, C*ab of 7.2 and an OD value of 0.93. Thus, recorded images had not a good color tone as black color and had a low recording density.

Example 8

As the first colorant, PRO JET FIRST BLACK 2 (trade name; available from Geneca Co.; an aqueous solution with a dye concentration of 4%), and as the second colorant, a mixture of PRO JET FIRST YELLOW 2 (trade name; available from Geneca Co.; an aqueous solution with a dye concentration of 4.3%) and PRO JET FIRST CYAN 2 (trade name; available from Geneca Co.; an aqueous solution with a dye concentration of 6%), respectively, were selected. Transmission colors of the respective aqueous dye solutions, each adjusted to have a dye concentration of 0.015% by weight, were measured under the measuring conditions of a $D_{65}$ light source, 2° visual field and a transmitted-light optical path length of 10 mm. As a result, in the case of PRO JET FIRST BLACK 2 (a first dye), L* was 0.9 and C*ab was 7.6 in the L*a*b* color system and the hue angle H° was 4.0°. In the case of PRO JET FIRST YELLOW 2 (a second dye), the hue angle H° was 101.2°. In the case of PRO JET FIRST CYAN 2 (a third dye), the hue angle H° was 241.0°. Accordingly, a closed angle between the first and second dyes was 97.20, a closed angle between the first and third dyes was 123.0°, a composed hue angle between the first and second dyes was calculated at 171.10°, and the composed, closed angle between the hue angle of the first dye and the composed hue angle was calculated at 167.10°.

Using these dyes, ink was prepared and its recording performance was evaluated in the following way: To 9.7 parts by weight of pure water, 75 parts by weight of the dye solution PRO JET FIRST BLACK 2, 0.1 part by weight of the yellow dye solution PRO JET FIRST YELLOW 2, 0.2 part by weight of the cyan dye solution PRO JET FIRST CYAN 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 4.3.

This ink was applied in a shear-mode type ink-jet recording head, disclosed in Japanese Patent Application Laid-open No. 2-150355. As a result, the ink was well jetted, and the recorded images obtained had L* of 38.0, C*ab of 3.1 and an OD value of 1.11. Thus, high-grade recorded images were obtained, having a good color tone as black color and a high recording density.

Example 9

Ink was prepared in the same manner as in Example 8 except that the cyan dye solution PRO JET FIRST CYAN 2 was replaced with a cyan dye (third dye)DUACYN DIRECT BLUE FRLSFVP 368 (trade name; available from Hoechst Japan Ltd.; for the transmission color of its aqueous dye solution adjusted to have a dye concentration of 0.015% by weight, the hue angle H° was 244.2° under the measuring conditions of a $D_{65}$ light source, 2° visual field and a transmitted-light optical path length of 10 mm) and the yellow dye solution PRO JET FIRST YELLOW 2 was replaced with a yellow dye (second dye) DUACYN ACID YELLOW XX-SF (trade name; available from Hoechst Japan Ltd.; for the transmission color of its aqueous dye solution adjusted to have a dye concentration of 0.015% by weight, the hue angle H° was 94.1° under the measuring conditions of a $D_{65}$ light source, 2° visual field and a transmitted-light optical path length of 10 mm). Accordingly, a closed angle between the first and second dyes was 90.1°, a closed angle between the first and third dyes was 119.8°, a composed hue angle between the first and second dyes was calculated at 169.15°, and the composed, closed angle between the hue angle of the first dye and the composed hue angle was calculated at 165.15°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.5.

Using this ink, images were recorded similarly. As a result, the ink was well jetted, and the recorded images obtained had L* of 38.6, C*ab of 3.9 and an OD value of 1.06. Thus, high-grade recorded images were obtained, having a good color tone as black color and a high recording density.

Example 10

Ink was prepared in the same manner as in Example 8 except that the cyan dye solution PRO JET FIRST CYAN 2 was replaced with a cyan dye (third dye) DAIWA IJ BLUE 319H (trade name; available from Daiwa Chemical Co. Ltd.; for the transmission color of its aqueous dye solution adjusted to have a dye concentration of 0.015% by weight, the hue angle H° was 250.0° under the measuring conditions of a $D_{65}$ light source, 2° visual field and a transmitted-light optical path length of 10 mm) and the yellow dye solution PRO JET FIRST YELLOW 2 was replaced with a yellow dye (second dye) DAIWA IJ YELLOW 205H (trade name; available from Daiwa Chemical Co. Ltd.; for the transmission color of its aqueous dye solution adjusted to have a dye concentration of 0.015% by weight, the hue angle H° was 98.3° under the measuring conditions of a $D_{65}$ light source, 2° visual field and a transmitted-light optical path length of 10 mm). Accordingly, a closed angle between the first and second dyes was 94.3°, a closed angle between the first and third dyes was 114.0°, a composed hue angle between the first and second dyes was calculated at 174.15°, and the composed, closed angle between the hue angle of the first dye and the composed hue angle was calculated at 170.15°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 4.1.

Using this ink, images were recorded similarly. As a result, the ink was well jetted, and the recorded images obtained had L* of 39.1, C*ab of 4.2 and an OD value of 1.10. Thus, high-grade recorded images were obtained, having a good color tone as black color and a high recording density.

Example 11

Ink was prepared in the same manner as in Example 8 except that the cyan dye solution PRO JET FIRST CYAN 2 was replaced with a cyan dye (third dye) PRO JET CYAN 1 (trade name; available from Geneca Co.; an aqueous solution with a dye concentration of 10%; for the transmission color of its aqueous dye solution adjusted to have a dye concentration of 0.015% by weight, the hue angle H° was 247.2° under the measuring conditions of a $D_{65}$ light source, 2° visual field and a transmitted-light optical path length of 10 mm) and the yellow dye solution PRO JET FIRST YELLOW 2 was replaced with a yellow dye (second dye) solution PRO JET YELLOW 1G (trade name; available from Geneca Co.; an aqueous solution with a dye concentration of 7.5%; for the transmission color of its aqueous dye solution adjusted to have a dye concentration of 0.015% by weight, the hue angle H° was 99.2° under the measuring conditions of a $D_{65}$ light source, 2° visual field and a transmitted-light optical path length of 1 mm). Accordingly, a closed angle between the first and second dyes was 95.2°, a closed angle between the first and third dyes was 116.8°, a composed hue angle between the first and second dyes was calculated at 173.20°, and the composed, closed angle between the hue angle of the first dye and the composed hue angle was calculated at 169.20°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.7.

Using this ink, images were recorded similarly. As a result, the ink was well jetted, and the recorded images obtained had L* of 38.1, C*ab of 3.2 and an OD value of 1.12. Thus, high-grade recorded images were obtained, having a good color tone as black color and a high recording density.

Example 12

Ink was prepared in the same manner as in Example 8 except that the cyan dye solution PRO JET FIRST CYAN 2 was replaced with a cyan dye (third dye) DAIWA IJ BLUE 319H (trade name; available from Daiwa Chemical Co. Ltd.; for the transmission color of its aqueous dye solution adjusted to have a dye concentration of 0.015% by weight, the hue angle H° was 250.0° under the measuring conditions of a $D_{65}$ light source, 2° visual field and a transmitted-light optical path length of 10 mm) and the yellow dye solution PRO JET FIRST YELLOW 2 was replaced with a yellow dye (second dye) DUACYN ACID YELLOW XX-SF (trade name; available from Hoechst Japan Ltd.; for the transmission color of its aqueous dye solution adjusted to have a dye concentration of 0.015% by weight, the hue angle H° was 94.1° under the measuring conditions of a $D_{65}$ light source, 2° visual field and a transmitted-light optical path length of 10 mm). Accordingly, a closed angle between the first and second dyes was 90.1°, a closed angle between the first and third dyes was 114.0°, a composed hue angle between the first and second dyes was calculated at 172.05°, and the composed, closed angle between the hue angle of the first dye and the composed hue angle was calculated at 168.05°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.7.

Using this ink, images were recorded similarly. As a result, the ink was well jetted, and the recorded images obtained had L* of 39.1, C*ab of 4.3 and an OD value of 1.04. Thus, high-grade recorded images were obtained, having a good color tone as black color and a high recording density.

Example 13

Ink was prepared in the same manner as in Example 8 except that the cyan dye solution PRO JET FIRST CYAN 2 was replaced with a third dye solution (for the transmission color of its aqueous dye solution adjusted to have a dye concentration of 0.015% by weight, the hue angle H° was 249.8° under the measuring conditions of a $D_{65}$ light source, 2° visual field and a transmitted-light optical path length of 10 mm) and the yellow dye solution PRO JET FIRST YELLOW 2 was replaced with the solution of a second yellow dye DAIWA IJ YELLOW 205H (trade name; available from Daiwa Chemical Co. Ltd.; for the transmission color of its aqueous dye solution adjusted to have a dye concentration of 0.015% by weight, the hue angle H° was 98.3° under the measuring conditions of a $D_{65}$ light source, 2° visual field and a transmitted-light optical path length of 10 mm). Accordingly, a closed angle between the first and second dyes was 94.3°, a closed angle between the first and third dyes was 114.2°, a composed hue angle between the first and second dyes was calculated at 174.05°, and the composed, closed angle between the hue angle of the first dye and the composed hue angle was calculated at 170.05°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.6.

Using this ink, images were recorded similarly. As a result, the ink was well jetted, and the recorded images obtained had L* of 38.4, C*ab of 3.5 and an OD value of 1.12. Thus, high-grade recorded images were obtained, having a good color tone as black color and a high recording density.

Comparative Example 3

Ink was prepared in the same manner as in Example 8 except that the cyan dye solution PRO JET FIRST CYAN 2 was replaced with a magenta dye (third dye) solution PRO JET FIRST MAGENTA 2 (trade name; available from Geneca Co.; an aqueous solution with a dye concentration of 5%; for the transmission color of its aqueous dye solution adjusted to have a dye concentration of 0.015% by weight, the hue angle H° was 27.4° under the measuring conditions of a $D_{65}$ light source, 2° visual field and a transmitted-light optical path length of 10 mm). Accordingly, a closed angle between the first and second dyes was 97.2°, a closed angle between the first and third dyes was 23.4°, a composed hue angle between the first and second dyes was calculated at 64.30°, and the composed, closed angle between the hue angle of the first dye and the composed hue angle was calculated at 60.30°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 1.1 and C*ab was 8.1.

Using this ink, images were recorded similarly. As a result, the ink was well jetted, but the recorded images obtained had L* of 42.3, C*ab of 5.5 and an OD value of 0.97. Thus, recorded images had not a good color tone as black color and had a low recording density.

15

Comparative Example 4

Ink was prepared in the same manner as in Example 11 except that the cyan dye solution PRO JET FIRST CYAN 2 was replaced with a third dye solution (an aqueous solution with a dye concentration of 8%; for the transmission color of its aqueous dye solution adjusted to have a dye concentration of 0.015% by weight, the hue angle H° was 13.6° under the measuring conditions of a $D_{65}$ light source, 2° visual field and a transmitted-light optical path length of 10 mm). Accordingly, a closed angle between the first and second dyes was 95.2°, a closed angle between the first and third dyes was 9.6°, a composed hue angle between the first and second dyes was calculated at 56.40°, and the composed, closed angle between the hue angle of the first dye and the composed hue angle was calculated at 52.40°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 1.0 and C*ab was 8.4.

Using this ink, images were recorded similarly. As a result, the ink was well jetted, but the recorded images obtained had L* of 42.3, C*ab of 6.5 and an OD value of 0.94. Thus, recorded images had not a good color tone as black color and had a low recording density.

Example 14

As the first colorant(dye), a dye solution with a dye concentration of 10% (an azo-type black anion dye) and as the second colorant(dye), PRO JET FIRST YELLOW 2 (trade name; available from Geneca Co.; an aqueous solution with a dye concentration of 4.3%), respectively, were selected, and recording performance was evaluated. Transmission colors of the respective aqueous dye solutions, each adjusted to have a dye concentration of 0.015% by weight, were measured under the measuring conditions of a $D_{65}$ light source, 2° visual field and a transmitted-light optical path length of 10 mm. As a result, in the case of the dye solution with a dye concentration of 10%, L* was 5.6 and C*ab was 8.3 in the L*a*b* color system, and the hue angle H° was 321.0°. In the case of PRO JET FIRST YELLOW 2, the hue angle H° was 101.2°. Accordingly, the closed angle was calculated at 140.2°.

To 44.7 parts by weight of pure water, 40 parts by weight of the dye solution with a dye concentration of 10%, 0.3 part by weight of the dye solution PRO JET FIRST YELLOW 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that L* was 0.9 and C*ab was 3.5.

This ink was applied in a shear-mode type ink-jet recording head, disclosed in Japanese Patent Application Laid-open No. 2-150355. As a result, the ink was well jetted, and the recorded images obtained had L* of 39.5, C*ab of 3.6 and an OD value of 1.05. Thus, high-grade recorded images were obtained, having a good color tone as black color and a high recording density.

Example 15

Ink was prepared in the same manner as in Example 14 except that the cyan dye solution PRO JET FIRST YELLOW 2 was replaced with a dye DUACYN ACID YELLOW XX-SF (trade name; available from Hoechst Japan Ltd.; for the transmission color of its aqueous dye solution adjusted to have a dye concentration of 0.015% by weight, the hue angle H° was 94.1° under the measuring conditions of a $D_{65}$ light source, 2° visual field and a transmitted-light optical path length of 10 mm). Accordingly, the closed angle was calculated at 133.1°.

This ink was diluted to 1/200 with pure water (dye concentration: about 0.02%), and its transmission color was measured under the measuring conditions of a $D_{65}$ light source, 2° visual field and a transmitted-light optical path length of 10 mm to reveal that L* was 0.8 and C*ab was 3.7.

Using this ink, images were recorded similarly. As a result, the ink was well jetted, and the recorded images obtained had L* of 38.9, C*ab of 3.9 and an OD value of 1.06. Thus, high-grade recorded images were obtained, having a good color tone as black color and a high recording density.

Comparative Example 5

Ink was prepared in the same manner as in Example 14 except that the dye solution PRO JET FIRST YELLOW 2 was not added.

This ink was diluted to 1/200 with pure water (dye concentration: 0.02%), and its transmission color was measured under the measuring conditions of a $D_{65}$ light source, 2° visual field and a transmitted-light optical path length of 10 mm to reveal that L* was 1.1 and C*ab was 9.8.

Using this ink, images were recorded similarly. As a result, the ink was well jetted, but the recorded images obtained had L* of 46.5, C*ab of 11.3 and an OD value of 0.95. Thus, recorded images had not a good color tone as black color and had a low recording density.

Comparative Example 6

Ink was prepared in the same manner as in Example F1 except that the dye solution PRO JET FIRST YELLOW 2 was replaced with a dye solution PRO JET FIRST MAGENTA 2 (trade name; available from Geneca Co.; an aqueous solution with a dye concentration of 5%; for the transmission color of its aqueous dye solution adjusted to have a dye concentration of 0.015% by weight, the hue angle H° was 27.4° under the measuring conditions of a $D_{65}$ light source, 2° visual field and a transmitted-light optical path length of 10 mm). Accordingly, the closed angle was calculated at 66.4°.

This ink was diluted to 1/200 with pure water (dye concentration: about 0.02%), and its transmission color was measured under the measuring conditions of a $D_{65}$ light source, 2° visual field and a transmitted-light optical path length of 10 mm to reveal that L* was 1.0 and C*ab was 14.0.

Using this ink, images were recorded similarly. As a result, the ink was well jetted, but the recorded images obtained had L* of 46.5, C*ab of 13.7 and an OD value of 0.96. Thus, recorded images had not a good color tone as black color and had a low recording density.

Example 16

As the first colorant(dye), DUACYN DIRECT BLACK HEF-SF (trade name; available from Hoechst Japan Ltd; an aqueous solution with a dye concentration of 10%) and as the second colorant(dye), PRO JET FIRST YELLOW 2 (trade name; available from Geneca Co.; an aqueous solution with a dye concentration of 4.3%), respectively, were selected, and recording performance was evaluated. Transmission color of the aqueous dye solution of DUACYN ACID BLACK HEF-SF, adjusted to have a dye concentration of 0.005% by weight, was measured under the measuring conditions of a D65 light source, 2° visual field and a transmitted-light optical path length of 10 mm to reveal that L* was 1.5, C*ab was 6.9, and the hue angle H° was 274.1°. Transmission color of the aqueous dye solution of PRO JET FIRST YELLOW 2, adjusted to have a dye concentration of 0.015% by weight, was measured in the same way to reveal that the hue angle H° was 101.2°. Accordingly, the closed angle was calculated at 172.9°.

To 64.7 parts by weight of pure water, 20 parts by weight of the dye solution DUACYN DIRECT BLACK HEF-SF, 0.3 part by weight of the dye solution PRO JET FIRST YELLOW 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that L* was 0.7 and C*ab was 2.5.

This ink was applied in a shear-mode type ink-jet recording head, disclosed in Japanese Patent Application Laid-open No. 2-150355. As a result, the ink was well jetted, and the recorded images obtained had L* of 33.1, C*ab of 2.7 and an OD value of 1.15. Thus, high-grade recorded images were obtained, having a good color tone as black color and a high recording density.

Example 17

Ink was prepared in the same manner as in Example 16 except that the cyan dye solution PRO JET FIRST YELLOW 2 was replaced with a dye DUACYN ACID YELLOW XX-SF (trade name; available from Hoechst Japan Ltd.; for the transmission color of its aqueous dye solution adjusted to have a dye concentration of 0.015% by weight, the hue angle H° was 94.1° under the measuring conditions of a $D_{65}$ light source, 2° visual field and a transmitted-light optical path length of 10 mm). Accordigly, the closed angle was calculated at 180.0°.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that L* was 0.8 and C*ab was 3.1.

Using this ink, images were recorded similarly. As a result, the ink was well jetted, and the recorded images obtained had L* of 35.7, C*ab of 3.5 and an OD value of 1.13. Thus, high-grade recorded images were obtained, having a good color tone as black color and a high recording density.

Example 18

As the first colorant(dye), DUACYN DIRECT BLACK HEF-SF (trade name; available from Hoechst Japan Ltd; an aqueous solution with a dye concentration of 10%) and as the second colorant(dye), PRO JET FIRST MAGENTA 2 (trade name; available from Geneca Co.; an aqueous solution with a dye concentration of 5%), respectively, were selected, and recording performance was evaluated. Transmission color of the aqueous dye solution of DUACYN DIRECT BLACK HEF-SF, adjusted to have a dye concentration of 0.005% by weight, was measured under the measuring conditions of a $D_{65}$ light source, 2° visual field and a transmitted-light optical path length of 10 mm to reveal that L* was 1.5, C*ab was 6.9, and the hue angle H° was 274.1°. Transmission color of the aqueous dye solution of PRO JET MAGENTA 2, adjusted to have a dye concentration of 0.015% by weight, was measured in the same way to reveal that the hue angle H° was 27.4°. Accordingly, the closed angle was calculated at 113.3°.

To 64.7 parts by weight of pure water, 20 parts by weight of the dye solution DUACYN DIRECT BLACK HEF-SF, 0.3 part by weight of the dye solution PRO JET FIRST MAGENTA 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that L* was 0.8 and C*ab was 3.1.

This ink was applied in a shear-mode type ink-jet recording head, disclosed in Japanese Patent Application Laid-open No. 2-150355. As a result, the ink was well jetted, and the recorded images obtained had L* of 36.7, C*ab of 3.1 and an OD value of 1.10. Thus, high-grade recorded images were obtained, having a good color tone as black color and a high recording density.

Example 19

Ink was prepared in the same manner as in Example 18 except that the cyan dye solution PRO JET FIRST MAGENTA 2 was replaced with a dye solution (an aqueous solution with a dye concentration of 8%; for the transmission color of its aqueous dye solution adjusted to have a dye concentration of 0.015% by weight, the hue angle H° was 13.6° under the measuring conditions of a $D_{65}$ light source, 2° visual field and a transmitted-light optical path length of 10 mm). Accordingly, the closed angle was calculated at 99.5°.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that L* was 0.8 and C*ab was 3.8.

Using this ink, images were recorded similarly. As a result, the ink was well jetted, and the recorded images obtained had L* of 36.9, C*ab of 4.0 and an OD value of 1.09. Thus, high-grade recorded images were obtained, having a good color tone as black color and a high recording density.

Example 20

As the first colorant(dye), DUACYN DIRECT BLACK HEF-SF (trade name; available from Hoechst Japan Ltd; an aqueous solution with a dye concentration of 10%), as the second colorant, a mixture of the second dye, PRO JET FIRST YELLOW 2 (trade name; available from Geneca Co.; an aqueous solution with a dye concentration of 4.3%) and the third dye, PRO JET FIRST MAGENTA 2 (trade name; available from Geneca Co.; an aqueous solution with a dye concentration of 5%), respectively, were selected. Transmission color of the aqueous dye solution of DUACYN DIRECT BLACK HEF-SF, adjusted to have a dye concentration of 0.005% by weight, was measured under the measuring conditions of a $D_{65}$ light source, 2° visual field and a transmitted-light optical path length of 10 mm to reveal that $L^*$ was 1.5, $C^*ab$ was 6.9 in the $L^*a^*b^*$ color system and the hue angle $H°$ was 274.1°. Transmission color of the aqueous dye solution of PRO JET YELLOW 2, adjusted to have a dye concentration of 0.015% by weight, was measured in the same way to reveal that the hue angle $H°$ was 101.2°. Transmission color of the aqueous dye solution of PRO JET FIRST MAGENTA 2, adjusted to have a dye concentration of 0.015% by weight, was measured in the same way to reveal that the hue angle $H°$ was 27.4°. Accordingly, a closed angle between the first and second dyes was 172.9°, a closed angle between the first and third dyes was 113.3°, a composed hue angle between the first and second dyes was calculated at 64.30°, and the composed, closed angle between the hue angle of the first dye and the composed hue angle was calculated at 150.20°.

To 64.8 parts by weight of pure water, 20 parts by weight of the dye solution DUACYN DIRECT BLACK HEF-SF, 0.1 part by weight of the dye solution PRO JET FIRST YELLOW 2, 0.1 part by weight of the dye solution PRO JET FIRST MAGENTA 2, 10 parts by weight of glycerol and 5 parts by weight of diethylene glycol n-monobutyl ether were added, and the mixture obtained was stirred for 30 minutes, followed by filtration with a membrane filter of 0.7 μm pore diameter to obtain an ink.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that $L^*$ was 0.7 and $C^*ab$ was 2.1.

This ink was applied in a shear-mode type ink-jet recording head, disclosed in Japanese Patent Application Laid-open No. 2-150355. As a result, the ink was well jetted, and the recorded images obtained had $L^*$ of 32.0, $C^*ab$ of 2.2 and an OD value of 1.16. Thus, high-grade recorded images were obtained, having a good color tone as black color and a high recording density.

Example 21

Ink was prepared in the same manner as in Example 20 except that the cyan dye solution PRO JET FIRST YELLOW 2 was replaced with a dye (second dye) DUACYN ACID YELLOW XX-SF (trade name; available from Hoechst Japan Ltd.; for the transmission color of its aqueous dye solution adjusted to have a dye concentration of 0.015% by weight, the hue angle $H°$ was 94.1° under the measuring conditions of a $D_{65}$ light source, 2° visual field and a transmitted-light optical path length of 10 mm). Accordingly, a closed angle between the first and second dyes was 180.0°, a closed angle between the first and third dyes was 113.3°, a composed hue angle between the first and second dyes was calculated at 60.75°, and the composed, closed angle between the hue angle of the first dye and the composed hue angle was calculated at 146.65°.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that $L^*$ was 0.7 and $C^*ab$ was 2.4.

Using this ink, images were recorded similarly. As a result, the ink was well jetted, and the recorded images obtained had $L^*$ of 33.2, $C^*ab$ of 2.3 and an OD value of 1.15. Thus, high-grade recorded images were obtained, having a good color tone as black color and a high recording density.

Example 22

Ink was prepared in the same manner as in Example 20 except that the cyan dye (third dye) solution PRO JET FIRST MAGENTA 2 was replaced with a dye solution (an aqueous solution with a dye concentration of 8%; for the transmission color of its aqueous dye solution adjusted to have a dye concentration of 0.015% by weight, the hue angle $H°$ was 13.6° under the measuring conditions of a $D_{65}$ light source, 2° visual field and a transmitted-light optical path length of 10 mm). Accordingly, a closed angle between the first and second dyes was 172.9°, a closed angle between the first and third dyes was 99.5°, a composed hue angle between the first and second dyes was calculated at 57.40°, and the composed, closed angle between the hue angle of the first dye and the composed hue angle was calculated at 150.20°. Accordingly, the composed hue angle of the second colorant was calculated at 143.30°.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that $L^*$ was 0.6 and $C^*ab$ was 2.2.

Using this ink, images were recorded similarly. As a result, the ink was well jetted, and the recorded images obtained had $L^*$ of 31.5, $C^*ab$ of 2.4 and an OD value of 1.15. Thus, high-grade recorded images were obtained, having a good color tone as black color and a high recording density.

Comparative Example 7

Ink was prepared in the same manner as in Example 16 except that the dye solution PRO JET FIRST YELLOW 2 was not added.

This ink was diluted to 1/200 with pure water (dye concentration: 0.01%), and its transmission color was measured under the measuring conditions of a $D_{65}$ light source, 2° visual field and a transmitted-light optical path length of 10 mm to reveal that $L^*$ was 1.1 and $C^*ab$ was 5.8.

Using this ink, images were recorded similarly. As a result, the ink was well jetted, but the recorded images obtained had $L^*$ of 44.5, $C^*ab$ of 7.1 and an OD value of 0.97. Thus, recorded images had not a good color tone as black color and had a low recording density.

Comparative Example 8

Ink was prepared in the same manner as in Example 16 except that the dye solution PRO JET FIRST YELLOW 2 was replaced with a dye solution DAIWA IJ BLUE 319H (trade name; available from Daiwa Chemical Co. Ltd.; for the transmission color of its aqueous dye solution adjusted to have a dye concentration of 0.015% by weight, the hue angle $H°$ was 250.0° under the measuring conditions of a $D_{65}$ light source, 2° visual field and a transmitted-light optical path length of 10 mm). Accordingly, the closed angle was calculated at 24.1°.

This ink was diluted to 1/200 with pure water (dye concentration: about 0.01%), and its transmission color was measured under the measuring conditions of a $D_{65}$ light source, 2° visual field and a transmitted-light optical path length of 10 mm to reveal that $L^*$ was 1.1 and $C^*ab$ was 11.0.

Using this ink, images were recorded similarly. As a result, the ink was well jetted, but the recorded images obtained had L* of 43.2, C*ab of 12.5 and an OD value of 0.97. Thus, recorded images had not a good color tone as black color and had a low recording density.

Comparative Example 9

Ink was prepared in the same manner as in Example 20 except that the dye solution PRO JET FIRST YELLOW 2 was replaced with a dye (second dye) solution DAIWA IJ BLUE 319H (trade name; available from Daiwa Chemical Co. Ltd.; for the transmission color of its aqueous dye solution adjusted to have a dye concentration of 0.015% by weight, the hue angle H° was 250.0° under the measuring conditions of a $D_{65}$ light source, 2° visual field and a transmitted-light optical path length of 10 mm). Accordingly, a closed angle between the first and second dyes was 24.1°, a closed angle between the first and third dyes was 113.3°, a composed hue angle between the first and second dyes was calculated at 138.70°, and the composed, closed angle between the hue angle of the first dye and the composed hue angle was calculated at 135.40°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 1.0 and C*ab was 8.2.

Using this ink, images were recorded similarly. As a result, the ink was well jetted, but the recorded images obtained had L* of 43.2, C*ab of 8.1 and an OD value of 0.98. Thus, recorded images had not a good color tone as black color and had a low recording density.

Comparative Example 10

Ink was prepared in the same manner as in Example 20 except that the dye solution PRO JET FIRST MAGENTA 2 was replaced with a dye (third dye) solution PRO JET FIRST CYAN 2 (trade name; available from Geneca Co.; an aqueous solution with a dye concentration of 6%; for the transmission color of its aqueous dye solution adjusted to have a dye concentration of 0.015% by weight, the hue angle H° was 241.0° under the measuring conditions of a $D_{65}$ light source, 2° visual field and a transmitted-light optical path length of 10 mm). Accordingly, a closed angle between the first and second dyes was 172.9°, a closed angle between the first and third dyes was 33.1°, a composed hue angle between the first and second dyes was calculated at 171.10°, and the composed, closed angle between the hue angle of the first dye and the composed hue angle was calculated at 103.00°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 1.1 and C*ab was 8.8.

Using this ink, images were recorded similarly. As a result, the ink was well jetted, but the recorded images obtained had L* of 43.1, C*ab of 8.3 and an OD value of 0.97. Thus, recorded images had not a good color tone as black color and had a low recording density.

Example 23

Ink was prepared in the same manner as in Example 1 except that the black dye solution PRO JET FIRST BLACK 2 was replaced with a black dye (first dye) PROJECT BLACK 1 (trade name; available from Geneca Co. Ltd.; for the transmission color of its aqueous dye solution adjusted to have a dye concentration of 0.015% by weight, the hue angle H° was 359.6° under the measuring conditions of a D65 light source, 2° visual field and a transmitted-light optical path length of 10 mm). Accordingly, the closed angle was calculated at 118.6°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.8.

Using this ink, images were recorded similarly. As a result, the ink was well jetted, and the recorded images obtained had L* of 37.6, C*ab of 3.9 and an OD value of 1.09. Thus, high-grade recorded images were obtained, having a good color tone as black color and a high recording density.

Example 24

Ink was prepared in the same manner as in Example 3 except that the black dye solution PRO JET FIRST BLACK 2 was replaced with a black dye (first dye) KAYASET BLACK 008 (trade name; available from Nippon Kayaku Co. Ltd.; for the transmission color of its aqueous dye solution adjusted to have a dye concentration of 0.015% by weight, the hue angle H° was 1.4° under the measuring conditions of a $D_{65}$ light source, 2° visual field and a transmitted-light optical path length of 10 mm). Accordingly, the closed angle was calculated at 111.4°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.6.

Using this ink, images were recorded similarly. As a result, the ink was well jetted, and the recorded images obtained had L* of 37.1, C*ab of 3.8 and an OD value of 1.11. Thus, high-grade recorded images were obtained, having a good color tone as black color and a high recording density.

Example 25

Ink was prepared in the same manner as in Example 4 except that the black dye solution PRO JET FIRST BLACK 2 was replaced with a black dye (first dye) DAIWA BLACK MSC (trade name; available from Kaiwa Kasei Co. Ltd.; for the transmission color of its aqueous dye solution adjusted to have a dye concentration of 0.015% by weight, the hue angle H° was 1.0° under the measuring conditions of a $D_{65}$ light source, 2° visual field and a transmitted-light optical path length of 10 mm). Accordingly, the closed angle was calculated at 113.8°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.7.

Using this ink, images were recorded similarly. As a result, the ink was well jetted, and the recorded images obtained had L* of 38.2, C*ab of 3.6 and an OD value of 1.09. Thus, high-grade recorded images were obtained, having a good color tone as black color and a high recording density.

Example 26

Ink was prepared in the same manner as in Example 8 except that the black dye solution PRO JET FIRST BLACK 2 was replaced with a black dye (first dye) PROJECT BLACK 1 (trade name; available from Geneca Co. Ltd.; for the transmission color of its aqueous dye solution adjusted to have a dye concentration of 0.015% by weight, the hue angle H° was 359.6° under the measuring conditions of a $D_{65}$ light source, 2° visual field and a transmitted-light optical path length of 10 mm). Accordingly, a closed angle between the first and second dyes was 101.6°, a closed angle between the first and third dyes was 118.6°, a composed hue angle between the first and second dyes was calculated at 171.10°, and the composed, closed angle between the hue angle of the first dye and the composed hue angle was calculated at 171.50°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.6.

Using this ink, images were recorded similarly. As a result, the ink was well jetted, and the recorded images obtained had L* of 37.6, C*ab of 3.7 and an OD value of 1.11. Thus, high-grade recorded images were obtained, having a good color tone as black color and a high recording density.

Example 27

Ink was prepared in the same manner as in Example 10 except that the black dye solution PRO JET FIRST BLACK 2 was replaced with a black dye (first dye) KAYASET BLACK 008 (trade name; available from Nippon Kayaku Co. Ltd.; for the transmission color of its aqueous dye solution adjusted to have a dye concentration of 0.015% by weight, the hue angle H° was 1.4° under the measuring conditions of a $D_{65}$ light source, 2° visual field and a transmitted-light optical path length of 10 mm). Accordingly, a closed angle between the first and second dyes was 96.9°, a closed angle between the first and third dyes was 111.4°, a composed hue angle between the first and second dyes was calculated at 174.15°, and the composed, closed angle between the hue angle of the first dye and the composed hue angle was calculated at 172.75°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.7 and C*ab was 3.5.

Using this ink, images were recorded similarly. As a result, the ink was well jetted, and the recorded images obtained had L* of 37.8, C*ab of 3.6 and an OD value of 1.13. Thus, high-grade recorded images were obtained, having a good color tone as black color and a high recording density.

Example 28

Ink was prepared in the same manner as in Example 11 except that the black dye solution PRO JET FIRST BLACK 2 was replaced with a black dye (first dye) DAIWA BLACK MSC (trade name; available from Kaiwa Kasei Co. Ltd.; for the transmission color of its aqueous dye solution adjusted to have a dye concentration of 0.015% by weight, the hue angle H° was 1.0° under the measuring conditions of a $D_{65}$ light source, 2° visual field and a transmitted-light optical path length of 10 mm). Accordingly, a closed angle between the first and second dyes was 98.2°, a closed angle between the first and third dyes was 113.3°, a composed hue angle between the first and second dyes was calculated at 173.20°, and the composed, closed angle between the hue angle of the first dye and the composed hue angle was calculated at 172.20°.

This ink was diluted to 1/200 with pure water (dye concentration: about 0.015%), and its transmission color was measured under the measuring conditions of a $D_{65}$ light source, 2° visual field and a transmitted-light optical path length of 10 mm to reveal that L* was 0.8 and C*ab was 3.5.

Using this ink, images were recorded similarly. As a result, the ink was well jetted, and the recorded images obtained had L* of 38.6, C*ab of 3.5 and an OD value of 1.10. Thus, high-grade recorded images were obtained, having a good color tone as black color and a high recording density.

What is claimed is:

1. A water-based black recording ink comprising an aqueous medium and a colorant dissolved or dispersed therein; said colorant comprising:

a first colorant wherein a pure-water-diluted aqueous solution of which, adjusted to have a concentration of from 0.005% by weight to 0.05% by weight, has a transmission color having L* of 4 or below and C*ab of 25 or below in the L*a*b* color system under measuring conditions of a $D_{65}$ light source, 2° visual field and a transmitted-light optical path length of 10 mm, and having a point HA on the a*-b* plane which represents the transmission color of the pure-water-diluted aqueous solution; and a second colorant wherein a pure-water-diluted aqueous solution of which, adjusted to have the same concentration, has a transmission color having a point HB on the a*-b* plane which represents the transmission color of the pure-water-diluted aqueous solution, under the same measuring conditions, and satisfies that a closed angle formed by a straight line connecting an original point and the point HA and a straight line connecting the original point and the point HB is 90° or greater on the a*-b* plane;

said first and second colorants being mixed so that an aqueous solution thereof diluted to 1/200 with pure water has a transmission color having C*ab of 5 or below in the L*a*b* color system under measuring conditions of a $D_{65}$ light source, 2° visual field and a transmitted-light optical path length of 10 mm.

2. The water-based black recording ink according to claim 1, wherein said closed angle is 130° or greater on the a*-b* plane.

3. The water-based black recording ink according to claim 1, wherein said second colorant is a mixture of at least two kinds of dyes.

4. The water-based black recording ink according to claim 3, wherein said first colorant is a first dye, said second colorant is a mixture of a second dye and a third dye, and both of closed angles between a hue angle of the first dye and that of the second dye and between a hue angle of the first dye and that of the third dye are 90° or greater on the a*-b* plane.

5. The water-based black recording ink according to claim 4, wherein a composed, closed angle between the hue angle of the first dye and a composed hue angle of the second and third dyes is 90° or greater on the a*-b* plane.

6. The water-based black recording ink according to claim 1, wherein said first colorant is a first dye having a hue angle H° of from 350° to 10° and said second colorant is a second dye having a hue angle H° of from 230° to 280° under said measuring conditions.

7. The water-based black recording ink according to claim 3, wherein said first colorant is a first dye having a hue angle H° of from 350° to 10° and said second colorant is a mixture of a second dye having a hue angle H° of from 70° to 120° and a third dye having a hue angle of 230° to 280° under said measuring conditions.

8. The water-based black recording ink according to claim 1, wherein said first colorant is a first dye having a hue angle H° of from 315° to 325° and said second colorant is a second dye having a hue angle H° of from 70° to 120° under said measuring conditions.

9. The water-based black recording ink according to claim 1, wherein said first colorant is a first dye having a hue angle H° of from 270° to 280° and said second colorant is a second dye having a hue angle H° of from 70° to 120° under said measuring conditions.

10. The water-based black recording ink according to claim 1, wherein said first colorant is a first dye having a hue angle H° of from 270° to 280° and said second colorant is has a hue angle H° of from 350° to 40° under said measuring conditions.

11. The water-based black recording ink according to claim 3, wherein said first colorant is a first dye having a hue angle H° of from 270° to 280° and said second colorant is a mixture of a second dye having a hue angle H° of from 70° to 120° and a third dye having a hue angle of 350° to 40° under said measuring conditions.

12. An ink-jet recording process carried out by jetting a water-based black recording ink to a recording medium in the form of droplets to make a record, wherein said water-based black recording ink comprising an aqueous medium and a colorant dissolved or dispersed therein; said colorant comprising;

a first colorant a pure-water-diluted aqueous solution of which, adjusted to have a concentration of from 0.005% by weight to 0.05% by weight, has a transmission color having L* of 4 or below and C*ab of 25 or below in the L*a*b* color system under measuring conditions of a $D_{65}$ light source, 2° visual field and a transmitted-light optical path length of 10 mm, and having a point HA on the a*-b* plane which represents transmission color of the pure-water-diluted aqueous solution; and a second colorant a pure-water-diluted aqueous solution of which, adjusted to have the same concentration, has a transmission color having a point HB on the a*-b* plane which represents the transmission color of the pure-water-diluted aqueous solution, under the same measuring conditions, and satisfies that a closed angle formed by a straight line connecting an original point and the point HA and a straight line connecting the original point and the point HB is 90° or greater on the a*-b* plane;

said first and second colorants being mixed so that an aqueous solution thereof diluted to 1/200 with pure water has a transmission color having C*ab of 5 or below in the L*a*b* color system under measuring conditions of a $D_{65}$ light source, 2° visual field and a transmitted-light optical path length of 10 mm.

13. The ink-jet recording process according to claim 12, wherein said colosed angle is 130° or greater on the a*-b* plane.

14. The ink-jet recording process according to claim 12, wherein said second colorant is a mixture of at least two kinds of dyes.

15. The water-based black recording ink according to claim 14, wherein said first colorant is a first dye, said second colorant is a mixture of a second dye and a third dye, and both of closed angles between a hue angle of the first dye and that of the second dye and between a hue angle of the first dye and that of the third dye are 90° or greater on the a*-b* plane.

16. The water-based black recording ink according to claim 15, wherein a composed, closed angle between the hue angle of the first dye and a composed hue angle of the second and third dyes is 90° or greater on the a*-b* plane.

17. The ink-jet recording process according to claim 12, wherein said first colorant is a first dye having a hue angle H° of from 350° to 10° and said second colorant is a second dye having a hue angle H° of from 230° to 280° under said measuring conditions.

18. The ink-jet recording process according to claim 14, wherein said first colorant is a first dye having a hue angle H° of from 350° to 10° and said second colorant is a mixture of a second dye having a hue angle H° of from 70° to 120° and a third dye having a hue angle of 230° to 280° under said measuring conditions.

19. The water-based black recording ink according to claim 12, wherein said first colorant is a first dye having a hue angle H° of from 315° to 325° and said second colorant is a second dye having a hue angle H° of from 70° to 120° under said measuring conditions.

20. The water-based black recording ink according to claim 12, wherein said first colorant is a first dye having a hue angle H° of from 270° to 280° and said second colorant is a second dye having a hue angle H° of from 70° to 120° under said measuring conditions.

21. The water-based black recording ink according to claim 12, wherein said first colorant is a first dye having a hue angle H° of from 270° to 280° and said second colorant is a second dye having a hue angle H° of from 350° to 40° under said measuring conditions.

22. The water-based black recording ink according to claim 14, wherein said first colorant is a first dye having a hue angle H° of from 270° to 280° and said second colorant is a mixture of a second dye having a hue angle H° from 70° to 120° and a third dye having a hue angle of 350° to 40° under said measuring conditions.

* * * * *